Figure 1:
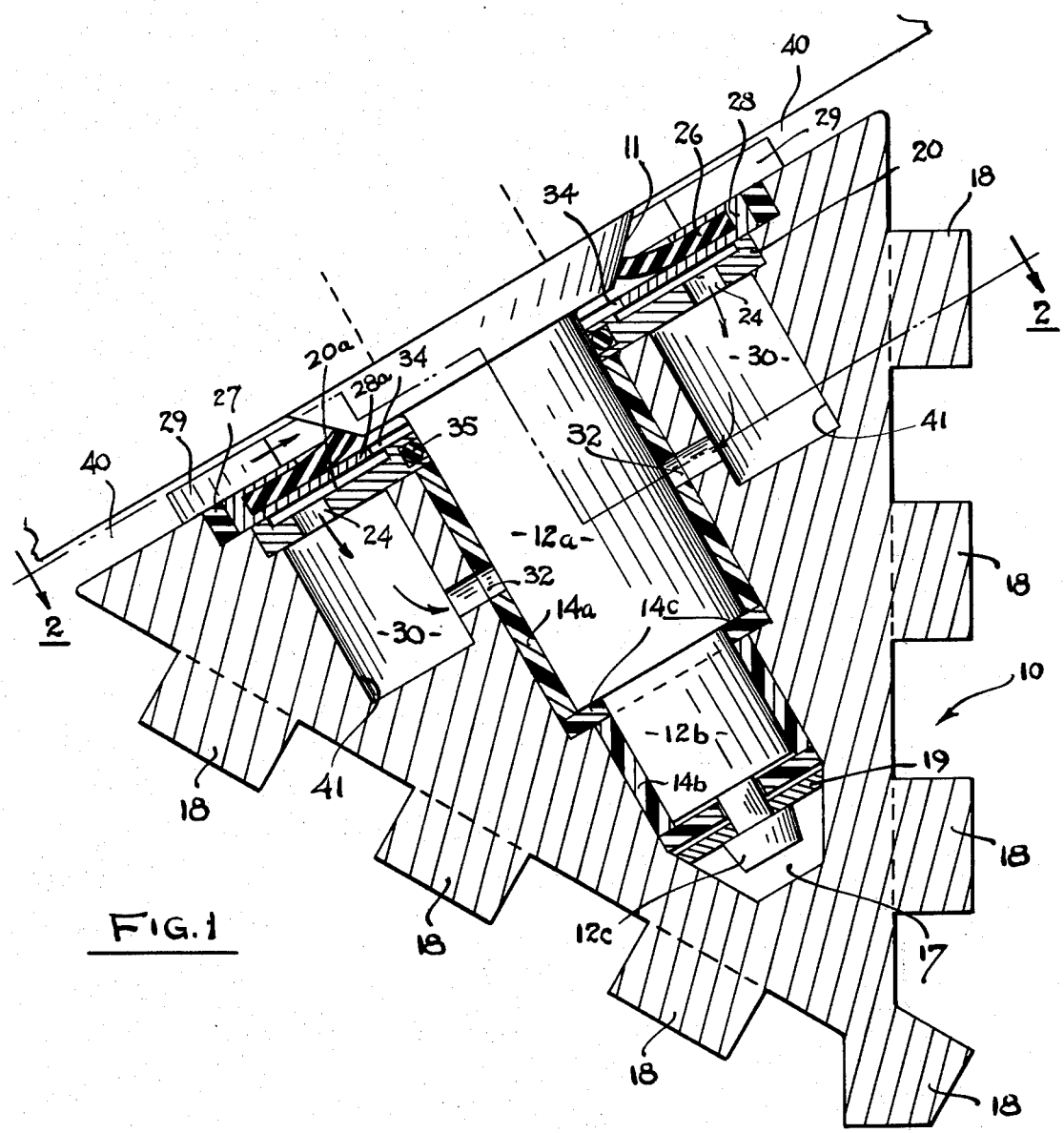

United States Patent [19]

Bodine et al.

[11] 4,223,749

[45] Sep. 23, 1980

[54] ROTARY EARTH BORING DRILL BIT WITH CENTRIFUGAL FOREIGN PARTICLE BARRIER DEVICE

[76] Inventors: Albert G. Bodine, 7877 Woodley Ave., Van Nuys, Calif. 91406; Ernest A. von Seggern, 1051 E. Angeleno Ave., Burbank, Calif. 91501

[21] Appl. No.: 20,807

[22] Filed: Mar. 15, 1979

Related U.S. Application Data

[63] Continuation-in-part of Ser. No. 889,939, Mar. 24, 1979, Pat. No. 4,156,470, which is a continuation-in-part of Ser. No. 698,286, Jun. 21, 1976, Pat. No. 4,091,988.

[51] Int. Cl.$^2$ ............................................... E21B 9/35
[52] U.S. Cl. .................................. 175/227; 175/313; 175/315; 175/337; 175/340; 175/372
[58] Field of Search ............... 175/102, 227, 228, 229, 175/313, 315, 337, 340, 371, 372

[56] References Cited

U.S. PATENT DOCUMENTS

| | | | |
|---|---|---|---|
| 4,049,066 | 9/1977 | Richey | 175/323 |
| 4,091,988 | 5/1978 | Bodine | 233/1 R |
| 4,167,219 | 9/1977 | McQueen | 175/372 |

*Primary Examiner*—William F. Pate, III
*Attorney, Agent, or Firm*—Edward A. Sokolski

[57] ABSTRACT

A drilling bit for drilling earthen material such as an oil well rotary cone drilling bit, which includes means for preventing foreign particles such as sand, rock cuttings, etc., from reaching the rotational bearings of the bit cones. This end result is principally achieved by means of a centrifugal slinger disc or wall which is positioned in external concentricity with the drill bit cone bearing, and operates to drive granular particles away from the bearings, thereby preventing such particles from reaching these bearing surfaces. The granular particles are driven by the slinger action through a series of apertures forming a channel running out to a peripheral region of the bit cones. A channel continuation is also provided for lubricating fluid, which may comprise ambient water or oil placed in chambers surrounding the bearings, this channel providing access for such lubricating fluid inwardly to the bit cone bearings. A disc-shaped wall member is provided opposite the slinger disc to minimize the escape of oil from the chambers when the bit is stationary. A ring member carrying a plurality of curved vanes, this ring member being externally concentric with the supporting shaft of the cone and located near the outer periphery of the bit cone may also be employed to prevent larger foreign particles, such as cuttings, from entering into the region of said slinger.

1 Claim, 2 Drawing Figures

ROTARY EARTH BORING DRILL BIT WITH CENTRIFUGAL FOREIGN PARTICLE BARRIER DEVICE

This application is a continuation-in-part of our Application Ser. No. 889,939, filed Mar. 24, 1979, now U.S. Pat. No. 4,156,470 which in turn is a continuation-in-part of our Application Ser. No. 698,286, filed June 21, 1976, now U.S. Pat. No. 4,091,988.

This invention relates to rotary drill bits for drilling earthen material, such as in the drilling of oil wells, and more particularly to such a device which employs centrifugal drive means for preventing the passage of granular particles to the bit support shaft bearings.

Conventional roller cone bits which are often utilized for drilling oil wells must operate in an environment which includes a considerable amount of abrasive material such as mud and sand, as well as the cuttings generated by the bit. The bearings of such bits generally do not have a very long life span in view of the fact that these abrasive particles get into the bearings and wear them out rather rapidly. Attempts have been made in the prior art to relieve this problem by employing rotary shaft seals which are used to retain oil around the shaft bearings of the bit. It has been found, however, that mud and other foreign particles become imbedded in the elastomer seal for the bearings, causing it to act as an abrasive lap which cuts away the mating surfaces. Eventually the seal fit becomes so loose that it loses its sealing effect, permitting the abrasive material to get into the bearing. Also, in drilling at greater depths, the temperature of the earth increases. This combined with the heat generated by the drilling operation tends to cause structural failure of the elastomer of the seal.

The present invention obviates the need for a seal, thereby avoiding the aforementioned problems of the prior art. At the same time, highly effective means are employed to prevent abrasive foreign material from reaching the bearings of the roller cone, this end result being achieved by means of a centrifugal slinger device which operates in conjunction with a channel structure to permit lubricant which may be provided from the ambient supply of water or from oil placed in chambers to selectively reach the cone shaft bearings. This device, at the same time, acts as a barrier to prevent particulate material from reaching such bearings. Further, annular or disc-shaped wall means is provided to help prevent oil from escaping from such chambers particularly when the roller cone is stationary.

Briefly described, our invention is as follows:

A slinger disc is mounted on or made a part of the bit cone for rotation therewith in external concentricity with the bearings, which may be sleeve bearings on which the bit cone is rotatably driven about a support shaft. The slinger disc extends radially outwardly from the bearings and has apertures combined therewith to permit fluid to flow therethrough into a series of chambers in said cone which surround at least a portion of the bearings and are in fluid communication therewith. Oil may be placed within the chambers for use in lubricating the bearings, this oil being retained by means of a flap seal during shipping and whenever the bit cone stops rotating, or ambient water may be solely employed for lubrication. In addition to the flap seal, an annular or disc-shaped wall member is provided to help keep oil from escaping when the cone is stationary. A plurality of channels are provided, these channels running from the chambers through apertures in the slinger disc region and thence through the flap valve and the outer wall of the bit cone, while the bit is rotating and the flap valve is driven to an open position by virtue of centrifugal force. A ring may also be provided near the outer entrance (or exit) of the channel, this ring having a plurality of curved vanes thereon which operate to drive out larger particles such as rock cuttings, preventing them from initially entering the channel. In operation, the rotating slinger disc structure drives particulate material outwardly, tending to prevent such material from reaching the bit bearings, some of these particles passing through the open flap valve and out through the channels formed in the bit cone with most of the particulate material being centrifugally "nailed" against the outer walls of the chambers in the cones. The chambers and associated channels and apertures form a U-tube configuration which operates to convey clean lubricant to the bearings and to drive the particulate material away from the bearings.

It is therefore an object of this invention to provide means for avoiding the damage of drill bit bearings by particulate foreign material.

It is a further object of this invention to obviate the need for sealed bearings in earthen material rotary drill bits.

It is still another object of this invention to provide an improved oil drill bit which employs centrifugal means for preventing particulate material from entering the bit bearings.

Figure 2:
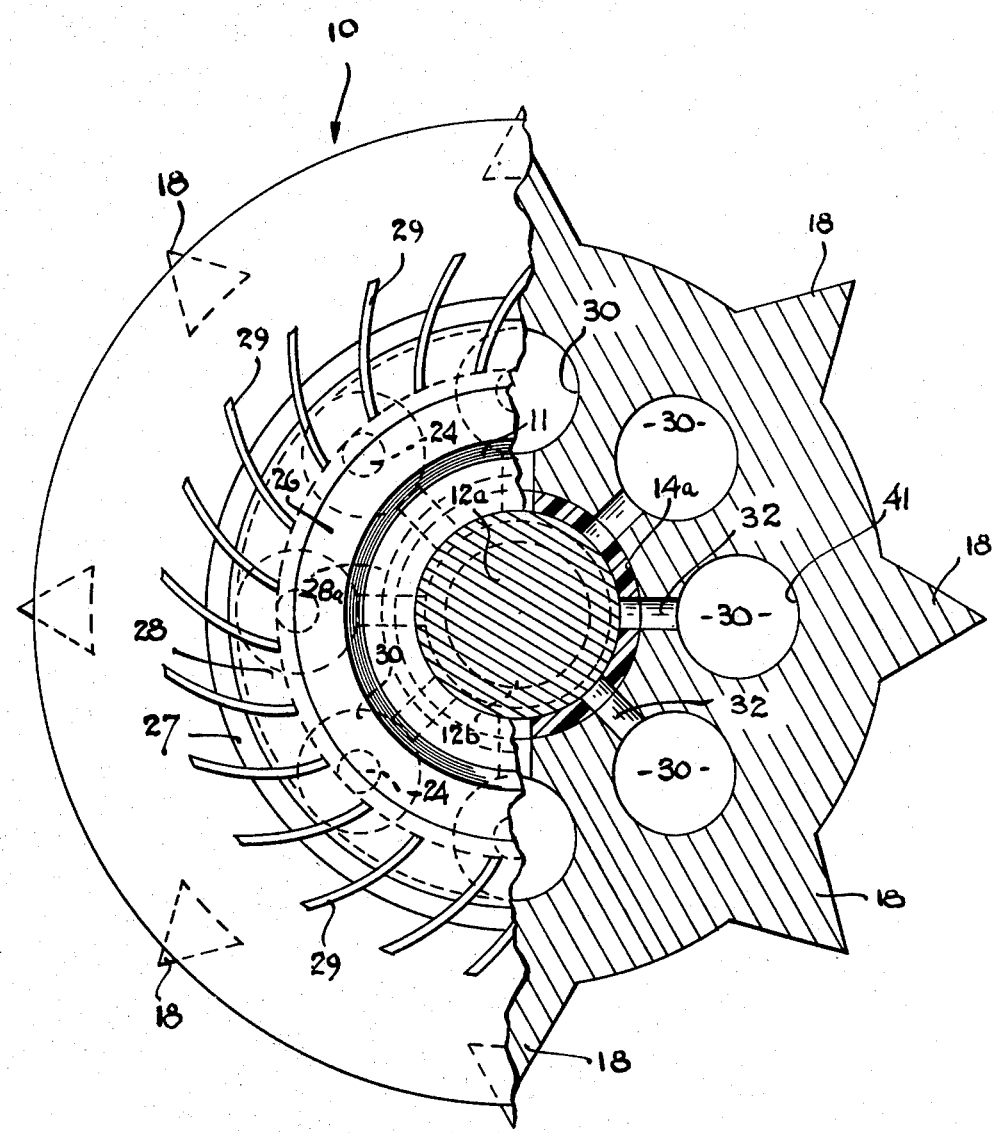

Other objects of this invention will become apparent as the description proceeds in connection with the accompanying drawings, of which:

FIG. 1 is a cross-sectional view of a preferred embodiment of the invention; and FIG. 2 is a cross-sectional view taken along the plane indicated by 2—2 in FIG. 1.

Referring now to the figures, a preferred embodiment of the invention is shown. Drill bit member 10 in the illustrative embodiment is of the roller cone type which is employed for drilling oil wells, and has a plurality of teeth 18 formed therearound. Such roller cone bits are manufactured by a number of manufacturers including Smith Tool, Irvine, California, and Reed Tool Company, Houston, Texas.

The bit 10 is rotatably mounted on a bearing pin which includes two cylindrical sections, 12a and 12b, the latter of these sections being stepped down in diameter to provide bearing support for the small end of the cone. The bit has a hollowed out central portion 17, which has stepped cylindrical sections to mate with bearing pin sections 12a and 12b. The inner walls of hollowed out portion 17 have sleeve bearings 14a, 14b and 14c fixedly attached thereto or formed thereon. These bearings may be made of a highly durable material such as fabric-phenolic, or of nitralloy, which will work with water as part or all of its lubricant. It is to be noted that the invention can be used to equal effect with bits employing conventional roller and ball bearings. The bearing pin also includes a cap 12c which operates to retain the bit on the pin, this cap abutting against disc-shaped inner wall portion 19 of the bit.

Disc member 20 is fixedly attached to or a part of the bit cone and rotates therewith, this disc member being externally concentric with bearing pin portion 12a. Disc 20, as to be explained further on in the specification, operates as a slinger in the same general fashion as the slingers described in our aforementioned patent application, to drive particulate material centrifugally outwardly, away from the bearings. Disc 20 has a plurality of fluid passages or ports 24 located in the outer portion thereof.

A plurality of chambers 30 are spaced within cone 10 around pin portion 12a, these chambers being in fluid communication with apertures 24 formed in disc 20 and with channels 32 which extend to the surfaces of the pin portion 21a through the bearing material of sleeve bearing 14a. A flap ring seal 26 is supported on an inner wall of the bit cone by means of holder 28, the ends of this seal abutting against sloped shoulder 11. Holder 28 has an annular or disc-shaped wall portion 28a which extends inwardly therefrom. A lubricant such as a suitable lubricating oil may be placed in chambers 30, this oil being retained within these chambers during shipping and when rotation of the bit is stopped during drilling operations by means of seal 26 and the annular wall portion 28a of the holder. This annular wall portion is particularly needed to serve as an oil "trap" in the event that the flap ring seal should wear out. It is to be noted in this regard that in certain instances it is necessary to stop the rotation of the bit quite a number of times during the drilling operation. When the bit stops turning, the roller cones will each have a cavity 30 at a "high" point. With a relatively long pause, there is a possibility of the lighter density oil fraction within the bearing to migrate through channels 32 to the high points of the cavities and if it were not for the "trap" provided, out through apertures 24 and passageways 40. In addition, the wall portion 28a positioned opposite the face of slinger disc 20 provides more effective centrifugal action between these members to condition the fluid separation ahead of ports 24. The face portion 20a of disc 20 is grooved to provide a channel between this face portion and the opposing surface of wall portion 28a.

It is to be noted that during rotation of the drill the ends of flexible seal 26 are driven outwardly away from shoulder 11 by the centrifugal force, thereby providing fluid communications from the outside of the bit to chamber 30 via passageways 40. Ring shaped member 27, which is an optional addition, is press fitted to the bit between seal holder 28 and an inner wall of the bit, this insert member carrying curved blades or vanes 29. These vanes rotate with the bit cone near the periphery thereof and operate to drive larger or heavier particles such as cuttings out through channels 40. An O-ring seal 35 may be provided along the inner edge of disc 20 but sealing at this point is not absolutely necessary in view of the fact that the operation of slinger disc 20 usually prevents particulate material from reaching this point.

The device operates as follows: With the bit rotating, a centrifugal force is generated in the space 34 where particulate material first meets the wall of rotating disc 20. The particulate material migrates radially outwardly to ports 24 and passes through these ports into chambers 30 and is held against the outer wall portions 41 of these chambers by the centrifugal force. The particulate material tends to force the lighter oil or clean water centrifugally separated therefrom through ports 32 to the bearing surfaces. Flap seal 26 also tends to open outwardly during rotation of the bit, such that a certain portion of the particulate material is centrifugally forced outwardly and further driven by vanes 29 out through channel 40.

The lubricating and particle barrier system employed is in the nature of a rotating "U-tube", with passageway 34 forming one leg of the "U", and a portion of chambers 30 and channels 32 forming the other leg, with the two legs being interconnected by ports 24 and the outer portions of chambers 30. Chambers 30 form the central interconnecting portions of the "U-tubes" and function as solids traps at the effective perimeter of the centrifuge formed thereby, while ends 32 of the "U"'s provide outlets to the bearings for clean lubricant, and at the opposite ends, passageways 34 form inlets to chambers 30 for water which initially may be combined with particulate material.

The device of the present invention thus provides a simple yet highly efficient means for avoiding the contamination of drill bit bearings with particulate material.

While the invention has been described and illustrated in detail, it is to be clearly understood that this is intended by way of illustration and example only and is not to be taken by way of limitation, the spirit and scope of this invention being limited only by the terms of the following claims.

We claim:
1. In a drill bit employing a roller cone,
a central cavity formed in said cone, said cavity having a closed end towards the apex of the cone and an open end at the base of the cone,
bearings formed within the walls of said cavity with a peripheral portion of said cavity outside the periphery of said bearings,
oil contained in said cavity for lubricating said bearings,
a bearing pin mounted on said bit, said bearings rotatably mounted on said bearing pin,
a disc-shaped wall member forming a slinger disc having a central aperture formed therein through which the pin passes in internally concentric relationship with said wall member, said wall member being mounted on said cone for rotation therewith near the base of the cone so as to partially close the open end of said cavity,
port means including an opening formed in an outer peripheral portion of said wall member for providing fluid communications between said cavity and the outside environment of the cone, and
a second disc-shaped wall member mounted on said cone for rotation therewith and positioned opposite the outer peripheral portion of said first mentioned wall member in parallel relationship thereto, a narrow radial annular passage being formed between said wall members, said second wall member operating to trap said oil and minimize its escape from said cavity when the cone is stationary,
whereby particulate material entering from outside the bit is forced outwardly by the centrifugal force generated by the disc-shaped member with the rotation of the cone so as to pass through the opening in said wall member and is centrifugally trapped in said outer peripheral portions of said cavity away from said bearings.

* * * * *